United States Patent
Parker et al.

(10) Patent No.: US 8,092,590 B2
(45) Date of Patent: Jan. 10, 2012

(54) MINERAL BINDER AND PROCESS FOR PRODUCING SAME

(75) Inventors: Frank Parker, Wiesbaden (DE); Josef Strunge, Wiesbaden (DE); Thomas Deuse, Offenbach (DE)

(73) Assignee: Dyckerhoff AG, Wiesbaden (DE)

( * ) Notice: Subject to any disclaimer, the term of this patent is extended or adjusted under 35 U.S.C. 154(b) by 650 days.

(21) Appl. No.: 12/194,115

(22) Filed: Aug. 19, 2008

(65) Prior Publication Data
US 2009/0277357 A1    Nov. 12, 2009

(30) Foreign Application Priority Data
Aug. 27, 2007 (DE) .................. 10 2007 040 349

(51) Int. Cl.
| C04B 7/00 | (2006.01) |
| C04B 14/00 | (2006.01) |
| C04B 5/00 | (2006.01) |
| C04B 7/14 | (2006.01) |
| C04B 28/08 | (2006.01) |
| C04B 7/34 | (2006.01) |
| C04B 28/00 | (2006.01) |
| C04B 32/00 | (2006.01) |

(52) U.S. Cl. ........ 106/737; 106/734; 106/736; 106/816; 106/789; 106/638

(58) Field of Classification Search .................. 106/734, 106/736, 816, 789, 796, 815, 638, 737
See application file for complete search history.

(56) References Cited

U.S. PATENT DOCUMENTS

| 3,785,844 | A | * | 1/1974 | Kawano | 106/757 |
| 4,205,994 | A | * | 6/1980 | Moyer et al. | 106/738 |
| 4,422,989 | A | * | 12/1983 | Hums et al. | 264/42 |
| 5,571,318 | A | * | 11/1996 | Griffith et al. | 106/725 |
| 5,972,103 | A | * | 10/1999 | Mehta et al. | 106/728 |
| 6,478,868 | B1 | * | 11/2002 | Reddy et al. | 106/696 |
| 6,506,248 | B1 | * | 1/2003 | Duselis et al. | 106/713 |
| 2004/0259718 | A1 | * | 12/2004 | Feige et al. | 501/127 |
| 2007/0084382 | A1 | * | 4/2007 | Holbek et al. | 106/634 |
| 2007/0163470 | A1 | * | 7/2007 | Chanut et al. | 106/724 |
| 2009/0107364 | A1 | * | 4/2009 | Ludwig et al. | 106/816 |

FOREIGN PATENT DOCUMENTS

| DE | 26 01 683 | 7/1981 |
| DE | 41 06 380 | 9/1991 |
| DE | 100 66 270 | 5/2007 |
| EP | 1 702 899 | 9/2006 |
| WO | WO 2006111225 A1 * | 10/2006 |

* cited by examiner

*Primary Examiner* — Jerry Lorengo
*Assistant Examiner* — Karam Hijji
(74) *Attorney, Agent, or Firm* — Brinks Hofer Gilson & Lione

(57) ABSTRACT

The invention relates to a mineral, hydraulic binder for producing concrete or mortars or cement suspensions, based on at least one cement. The cement comprises clinker phases such as, $C_3S$, $C_2S$, $C_3A$, and $C_4AF$, which on reaction with water form hydrate phases that cure to form hardened cement. The cement displays a delay phase after mixing with water of some hours, e.g. from 4 to 8 hours, during which time no appreciable curing reaction takes place. The binder further comprises at least one finely divided $SiO_2$ component and at least one finely divided CaO component, which react with make-up water during the delay phase to form calcium silicate hydrate phases that cure as a result of a pozzolanic reaction and produce early strength.

24 Claims, 3 Drawing Sheets

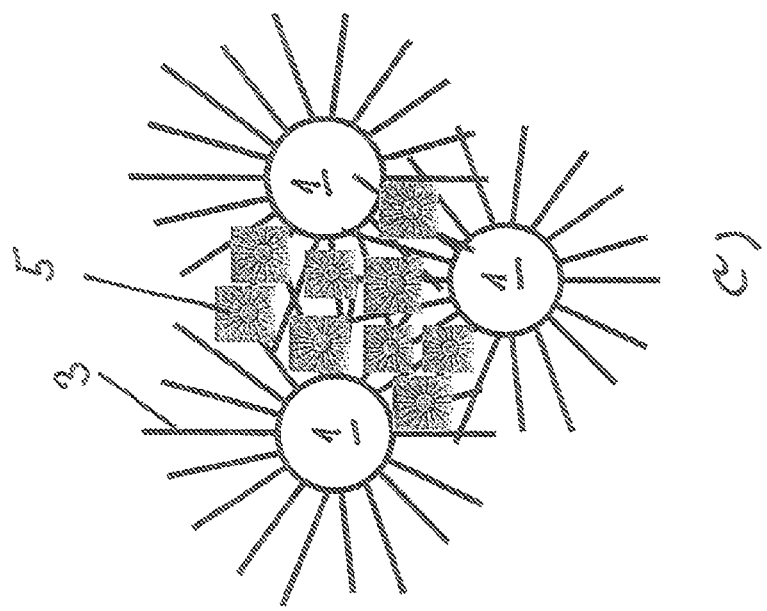
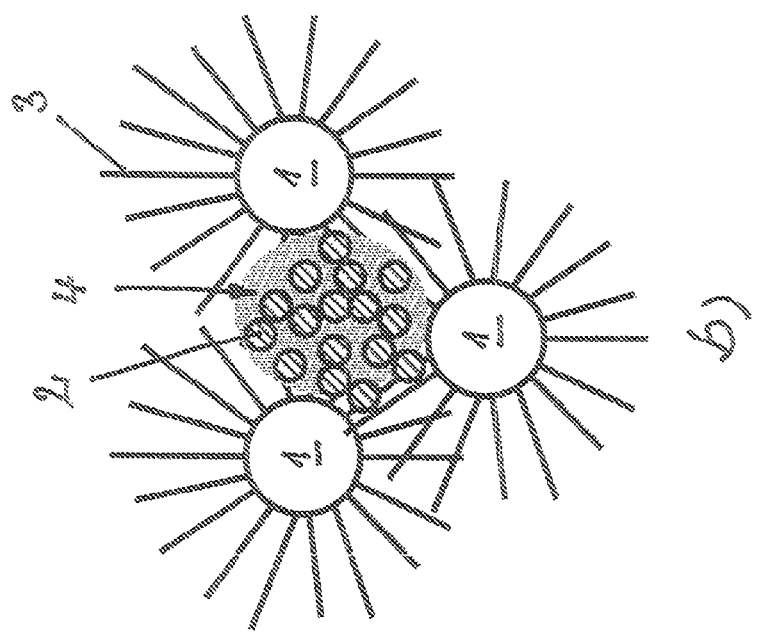
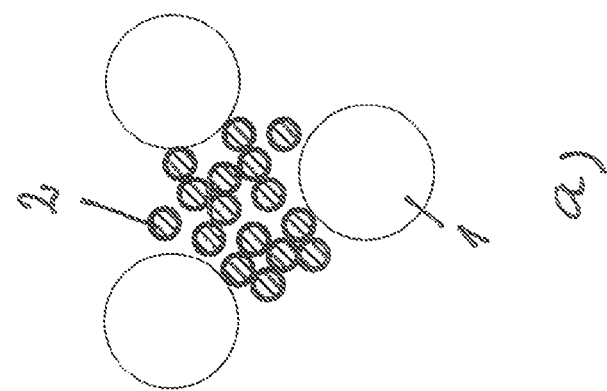
fig. 1

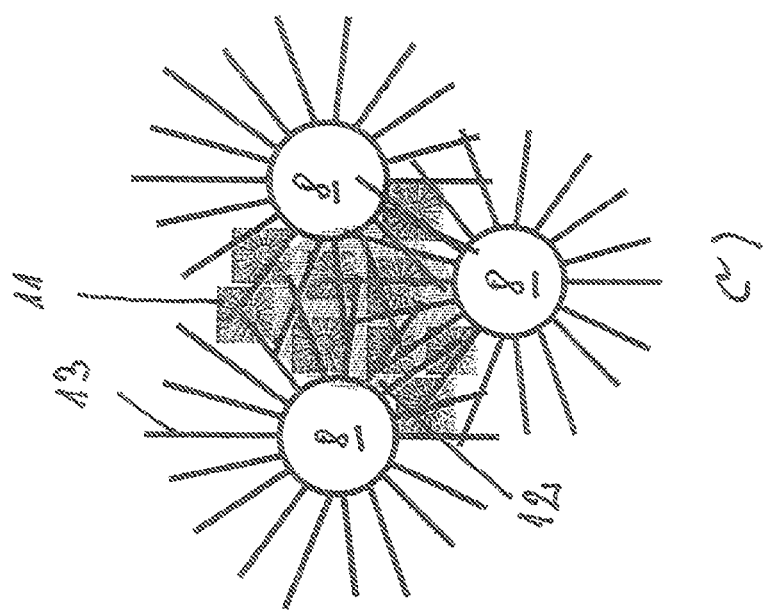
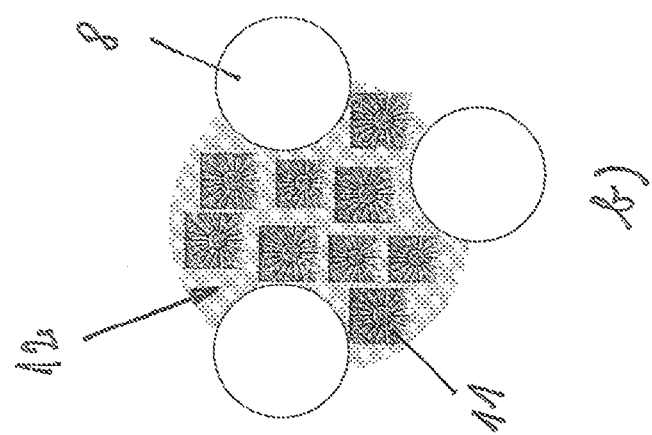
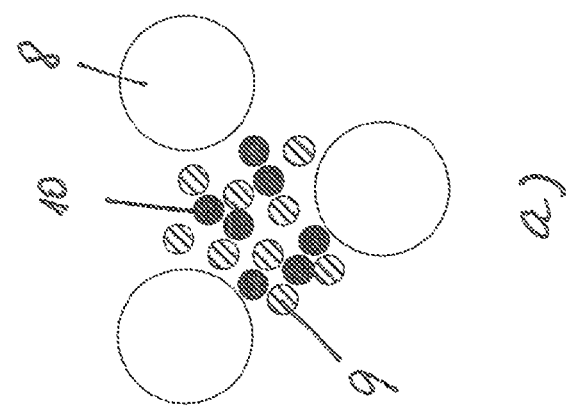
Fig. 3

MINERAL BINDER AND PROCESS FOR PRODUCING SAME

This application claims priority to German Patent Application No. 10 2007 040 349.8 filed Aug. 27, 2007, the entire contents of which are incorporated herein by reference.

FIELD

The invention relates to a mineral binder and a process for producing it with respect to standardized cements. More specifically, this invention relates to producing early-strength and/or high-strength concretes, mortars, or cement suspensions.

BACKGROUND

Early-strength and/or high-strength concretes are also referred to as high-performance concretes that either set or cure quickly (quick-setting concretes) or exhibit relatively high strengths and are particularly resistant toward aggressive media (high-strength concrete).

Quick-setting concretes are generally produced using quick-setting cements derived from particular clinkers comprised substantially of calcium sulfoaluminates, high-alumina cements, or mixtures of high-alumina cement with portland cement. These particular clinkers, may have its early strength be generally controlled by means of organic additives. Such organic additives, which are foreign constituents in these mineral mixes, can have undesirable side effects and react uncontrollably in the case of temperature differences and/or raw material fluctuations; exhibit adverse effects, such as slow solidification and curing; or even cause failure in regards to solidification and curing. Thus quick-setting cement is therefore relatively unsuitable for the production of ready-mixed concrete.

Another type of quick-setting cement uses a hydraulic binder, which is capable of flow and solidification after the addition of water, together with an accelerator component that functions to accelerate setting. The accelerator component is normally very fine calcium hydroxide particles having particular specific surface areas and/or particle sizes, as shown in International Publication No. WO 2006/111,225A1, the entire contents of which are incorporated herein by reference. In this document, the prior art in the field known at the time is summarized and it is indicated that the accelerated formation of calcium silicate hydrate phases associated with the calcium silicate in the cement particles is critical for the establishment of strength. Accordingly, the fine calcium hydroxide particles that are added should accelerate the calcium silicate hydrate formation (CSH formation) commencing after about 6 to 8 hours by nucleation.

In the case of quick-setting cements containing calcium hydroxide as an accelerator component, such as described in WO 2006/111,225A1, there is a risk of unsatisfactory storage stability. It is known that calcium hydroxide undergoes carbonate formation in the presence of atmospheric carbon dioxide. The reaction behavior of these quick-setting cements is consequently not constant. As a result, the high early strength potential cannot always be exploited.

To obtain high-strength and particularly resistant concretes, it is usual to use low-$C_3A$ portland cements of the strength class 42.5 or 52.5 R in combination with microsilica. The microsilica is collected as fly dust in ferrosilicon production and comprises, for example, from 85 to 98% by weight of amorphous $SiO_2$. The objective is to achieve very dense packing of spheres in the dry phase which then, after addition of water, also leads to a cement paste in which the particles are closely packed. In addition, the microsilica is supposed to react with the calcium hydroxide ($Ca(OH)_2$) that is liberated after about 6-8 hours from the reaction of the cement clinker phases, (e.g., calcium silicate phases, in particular $C_3S$) or secondary constituents with water.

While the hydrate phases are formed from, for example, the $C_3A$ and $C_3S$ of the clinker particles, microsilica and $Ca(OH)_2$ form additional C—S—H phases which then expand into the voids that are still present, thereby, making the cure hardened cement matrix denser. As a result, this pozzolanic reaction between the microsilica and the $Ca(OH)_2$ forms particularly dense and thus resistant and durable concretes that may sometimes exhibit an extremely high compressive strength. Disadvantages of the use of microsilica (e.g., silica dust from iron silicide production) include the concrete color, which is usually too dark and nonuniform for visible concrete, and the necessity of installing and operating a separate costly and complicated metering facility.

The reaction principle of the pozzolanic reaction between, for example, microsilica and $Ca(OH)_2$ is shown schematically in FIGS. 1a, 1b, and 1c. Initially, a dry mixture of cement particles 1 and microsilica particles 2 is present (FIG. 1a). After mixing with water and solidification, there is the delay phase known to those skilled in the art during which the mixture does not undergo any appreciable or further curing. Only after, for example, about 6-8 hours does a curing reaction of the silicate and aluminate phases with water occurs that forms, for example, acicular CSH phase crystals 3, resulting in the liberation of $Ca(OH)_2$ 4 (FIG. 1b). The $Ca(OH)_2$ reacts with the microsilica particles 2 and additionally forms fine C—S—H phase crystals 5. These crystals densify the structure of the cure hardened cement and by means of this pozzolanic reaction produce a denser microstructure exhibiting higher strength and durability (FIG. 1c).

Not only microsilica, but also other $SiO_2$ components, such as silica dust, nanosilica, metakaolin, or fly ash can be used for the known pozzolanic reaction.

Another technology for producing high-performance concretes, which is likewise based only on mineral material and makes an increase in early strength possible without requiring pozzolanic reactions, is based on binders that are optimized only in terms of particle size. In this technology, use is made of normal cements in combination with superfine cements. The production of superfine cements is known, for example, from European Patent No. EP 0 696 558 B1, the entire contents of which are incorporated herein by reference. These superfine cements have a particle size below 20 μm and can be produced economically on an industrial scale down to particle sizes of 2 μm.

Upon utilizing this technology, formulation-dependent high-performance cements such as those in high-early-strength concretes; cements for high-strength concretes, preferably high-strength visible concretes; and cements having a particular resistance, e.g. toward aggressive media, can be made. These high-performance cements are standard cement formulations that exhibit extraordinary properties with additives only required to adjust for processability.

FIG. 2 schematically shows the principles associated with this technology. The relatively coarse particle 6 of the normal cement may have a diameter ($d_{95}$) in the range from 25 to 30 μm. A $d_{95}$ particle diameter means that about 95% of the particle diameters measured by volume percent has a value within the specified range. In the interstices between the coarse particle 6, the relatively small particles 7 of the superfine cement may have a particle size diameter ($d_{95}$) in the range from 2 to 20 μm. A supplementation of and an increase in the early strength exhibited by this cement after 6-8 hours can according to this technology be achieved by the addition of $Ca(OH)_2$ (see WO 2006/111,225A1 or finely divided silica.

This technology is limited in that the final strength of the cement is not increased (see WO 2006/111,225A1, table 1: compressive strengths after 28 days), rather the early strength of the cement is only established earlier and capable of being regulated.

It is an object of the invention to provide hydraulic storage-stable binders based on only mineral materials, which can achieve high strengths earlier and exhibit increased end or final strengths as compared to known hydraulic binders.

BRIEF DESCRIPTION OF THE DRAWINGS

The drawings described herein are for illustration purposes only and are not intended to limit the scope of the present disclosure in any way.

FIG. 1a is a schematic representation of a pozzolanic reaction in its initial phase showing a dry mixture of cement and microsilica particles;

FIG. 1b is a schematic representation of the pozzolanic reaction of FIG. 1a after mixing with water and solidification;

FIG. 1c is a schematic representation of the pozzolanic reaction of FIG. 1b after densifying the structure of the cure hardened cement;

FIG. 3a is a schematic representation of the initial dry mixture of the hydraulic binder according to one embodiment of the present invention;

FIG. 3b is a schematic representation of the mixture of FIG. 3a after the addition of water and the formation of CSH phases according to the teachings of the present invention; and FIG. 3c is a schematic representation of the mixture of FIG. 3b towards the end of the first curing phase according to the teachings of the present invention.

DESCRIPTION OF INVENTION

Figure 2:
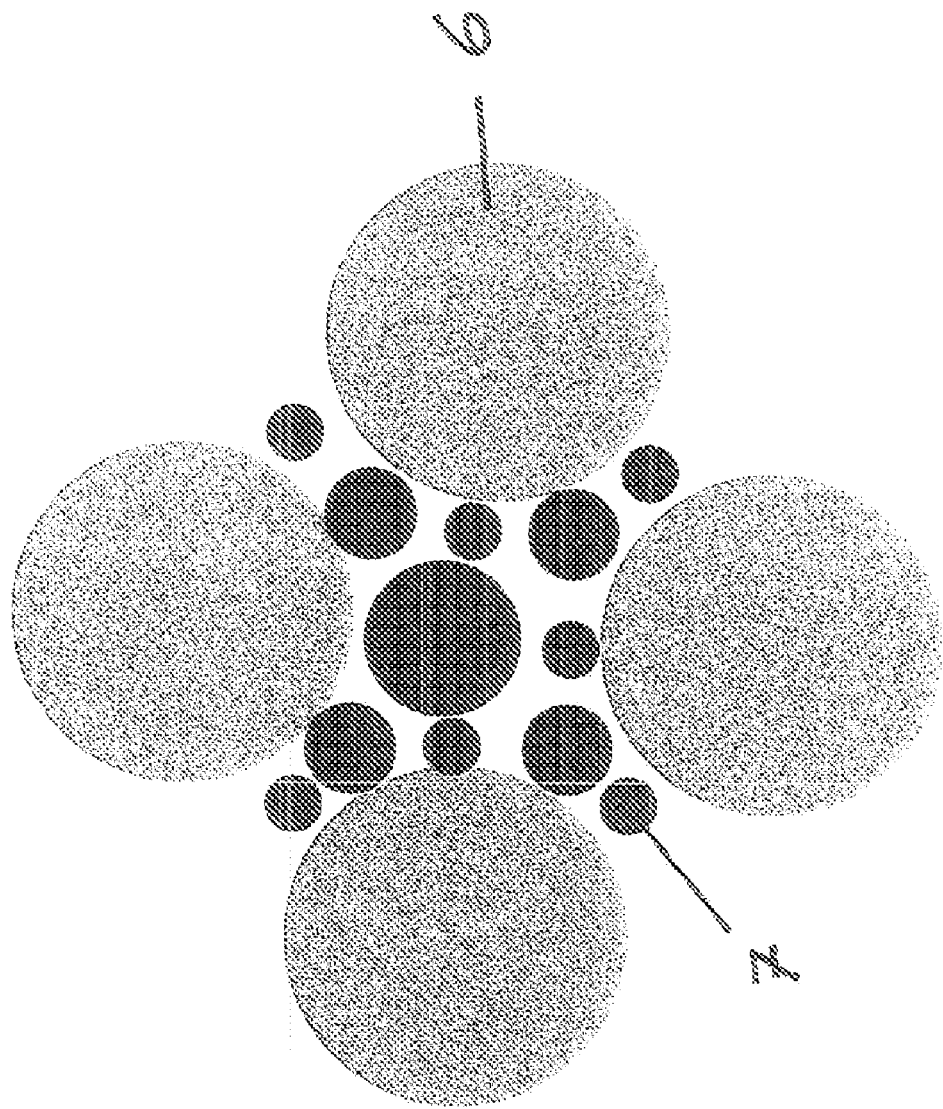
FIG. 2 is a schematic representation cement showing superfine cement particles within the interstices of the coarse particles of the normal cement.

The invention relates to binders that are suitable for producing quick-setting, high-strength, and preferably resistant concretes where the level of strength can be regulated in a simple manner.

It is now possible to generate high strengths earlier, even during the delay phase associated with water-containing mixtures, by using the novel hydraulic binders of the present invention because these binders function independent of the later strength development of the cement mineral phases. Thus these binders also function relatively independent of the formation of $Ca(OH)_2$ or hydrates of $C_3S$ during the later phase of cement mineral phase development. Many grades or types of cement which have different reaction mechanisms for curing that takes place after the above mentioned delay phase can consequently be used. However, portland cements, portland composite cements, and blast furnace slag cements whose normal curing due to the reaction of the cement mineral phases commences only after a delay phase of (e.g., about 6-8 hours) is preferred for producing the hydraulic binders of the present invention. In one aspect, present invention provides for setting the time of the early pozzolanic reaction so that it commences during the delay phase associated with the cement.

One embodiment of the present invention is illustrated in FIGS. 3a, 3b, and 3c. The initial dry mixture of the hydraulic binder of the present invention preferably comprises relatively coarse cement particles 8. In the interstices between the cement particles 8, there are particles 9 of an added, finely divided (flour-fine) $SiO_2$ component and particles 10 of an added, finely divided (flour-fine) CaO component (FIG. 3a). After addition of water, the reaction between the $SiO_2$ component and the CaO component commences, preferably, during the delay phase, but in any case before development of the CSH phases from the cement minerals. Substantially finely divided, calcium silicate phases 11 (FIG. 3b) undergoing curing are formed after only a delay, for example, about 1 hour without the processability (e.g., rheology) being adversely affected. Subsequently or even toward the end of this first pozzolanic curing phase, $Ca(OH)_2$ 12 and finally the C—S—H phases 13 are formed from the cement particles 8, with the C—S—H phases 13 expanding into the existing C—S—H phase microstructure 11 of the previous pozzolanic reaction (FIG. 3c).

It has been discovered that the later curing reactions of the cement particles commence earlier relative to the delay phase and the delay phase is therefore shortened when, according to the present invention, the previously developed pozzolanic curing phases are already present. The earlier pozzolanic system therefore has a synergistic effect.

It is surprising that the pozzolanic reaction does not have any adverse effect on the processability and the subsequent curing reactions of the cement minerals after the delay phase.

It is also surprising that, according to one aspect of the present invention, not only can the cement achieve early strengths at a substantially earlier point in time, namely during the delay phase, but the end or final strengths after 28 days can also be increased considerably.

In one embodiment of the present invention, normal cements having diameter ($d_{95}$) values in the range from about 20 to 70 μm, preferably from about 25 to 35 μm, are combined with the $SiO_2$ component and the CaO component. In another embodiment of the present invention, normal cements are mixed with superfine cements having $d_{95}$ values in the range from about 2 to 20 μm, preferably from about 6 to 16 μm, and combined with the $SiO_2$ and CaO components for the early pozzolanic reaction. Another embodiment of the present invention provides for at least two different $SiO_2$ components to be used for the $SiO_2$ component that differ in terms of their particle size distribution and preferably in the way in which they have been produced. Here, a first $SiO_2$ component, such as precipitated synthetic silica, among others having agglomerate particle diameters, $d_{95}$ in the range from about 3 to 15 μm, preferably from 3 to 5 μm and a second $SiO_2$ component, such as pyrogenic synthetic silica, among others having primary particle diameters in the range from about 0.007 to 0.04 μm (about 7 to 40 nm), preferably from about 0.01 to 0.02 μm, are used. The strength development of the pozzolanic reaction can be regulated or controlled in a simple manner by means of the ratio of these two components because the fine constituents of the finer $SiO_2$ components react more quickly. The particle diameter can be easily measured using a Multisizer with a 100 μm capillary by a method based on ASTM C 690-1992.

For the purposes of the present invention and as known to one skilled in the art, finely divided means particle diameters of <15 μm; superfine means nanosized particles with primary particle diameters of <0.04 μm. Normal cements have particle diameters $d_{95}$ in the range from 20 to 70 μm and specific surface areas in the range from 0.3 to 0.8 $m^2/g$ determined by the Blaine method and superfine cements have particle diameters $d_{95}$ in the range from 2 to 20 µm and specific surface areas in the range from 1 to 5 m²/g measured by the BET method.

According to another aspect of the present invention, a simple means of regulation is given by the use of different CaO components. The use of CaO (quicklime) brings about a faster reaction and higher early strengths, as well as end strengths than the use of Ca(OH)$_2$ (slake lime). The slaking reaction of quicklime on addition of the make-up water is believed to play an important role because the nascent Ca(OH)$_2$ resulting therefrom creates particularly favorable conditions for the reaction with the SiO$_2$ component.

Several examples of effective compositions of hydraulic binders according to one aspect of the present invention are shown in table 1.

TABLE 1

|  | Particle size (µm)$_2$ $d_{95}$ | Proportion [Parts by weight] |
|---|---|---|
| Normal cement | from about 20 to 70, preferably from about 25 to 35 | from about 0 to 100, preferably from about 40 to 90, more preferably from about 50 to 80 |
| Superfine cement and/or superfine ground clinker and/or superfine ground slag | from about 2 to 20, preferably from about 6 to 16 | from about 0 to 100, preferably from about 1 to 50, more preferably from about 25 to 30 |
| First SiO$_2$ component (agglomerate particles) | from about 3 to 15, preferably from about 3 to 5 | from about 0 to 5, preferably from about 0.1 to 5, more preferably from about 0.1 to 5 |
| Second SiO$_2$ component (primary particles) | from about 0.007 to 0.04, preferably from about 0.01 to 0.02 | from about 0 to 5, preferably from about 0.1 to 5, more preferably from about 0.1 to 3 |
| CaO component | from about 0.5 to 100, preferably from about 20 to 80 | from about 0 to 15, preferably from about 0.1 to 15, more preferably from about 0.1 to 5 |
| Ca(OH)$_2$ component | from about 0.7 to 100, preferably from about 0.7 to 35 | from about 0 to 15, preferably from about 0.1 to 15, more preferably from about 0.1 to 5 |

The cement phase used according to one aspect of the present invention may be comprised of portland cements, portland composite cements and slag cements, with portland cements being preferred. Superfine cements which have been produced as described in EP 0 696 558 B1 may be used.

The first SiO$_2$ component is, preferably a precipitated, synthetic silica (e.g. SIPERNAT from Degussa) with nanosized particles having a specific surface area (in N$_2$ atmosphere measured using an area meter by a method based on ISO 5794-1, Annex D) in the range from about 50 to 750 m²/g, preferably from about 50 to 200 m²/g, and the second SiO$_2$ component is, preferably, a pyrogenic silica (e.g. AEROSIL from Degussa) with nanosized particles having a specific surface area determined by the BET method in accordance with DIN 66136 in the range from about 30 to 380 m²/g, preferably from about 50 to 200 m²/g.

These synthetic silicas with nanosized particles can be obtained pyrogenically from the vaporization of silicon tetrachloride in a hydrogen/oxygen flame or by means of a wet chemical precipitation process from water glass and sulfuric acid. Both processes form primary particles in the range of a few nanometers: e.g. from 5 to 50 nanometers in the case of pyrogenic synthetic silica (Aerosil) and from 5 to 100 nanometers in the case of precipitated synthetic silicas (Sipernat). In the production process, these primary particles form aggregates in which the primary particles are bound directly via solid bridges of solid. These aggregates may subsequently form agglomerates. These agglomerates can then be dispersed back into aggregates during their shear-intensive incorporation into other materials. The aggregate size or diameter is less than 200 nanometers (e.g. >0.2 µm) in the case of pyrogenic silicas, but is in the micron range (e.g. >3 µm) in the case of precipitated synthetic silicas.

The CaO component is preferably quicklime, e.g. white fine lime and/or calcined hydraulic lime, or a slake lime, e.g., white fine slake lime and/or hydraulic slake lime. The specific surface area of the quicklime is preferably in the range from about 1 to 3 m²/g (BET). The specific surface area of the slake lime is preferably in the range from about 18 to 25 m²/g or above (BET).

In one embodiment of the present invention, a particularly high storage stability of the mixtures can be achieved in a simple manner by premixing at least one very light synthetic silica with the comparatively heavy quicklime and/or slake lime. The silica component is believed to protect the very hydrophilic CaO components against premature reactions with atmospheric moisture and carbon dioxide from the air.

According to one aspect of the present invention, the formation of C—S—H phases 27 from Ca(OH)$_2$ and synthetic silica commences as early as about one hour after addition of water. This preliminary pozzolanic reaction is then, substantially complete about 3 hours after addition of water. However, this pozzolanic reaction can also continue for a longer time, e.g. up to 6 hours, because it is dependent on the reactivity of the reactants.

After 6 hours, preferably from about 6 to 8 hours, C—S—H phases from the cement mineral reaction with water then grow through the conglomerate of C—S—H phases from the earlier pozzolanic reaction.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A mineral hydraulic binder for producing concretes, mortars, or cement suspensions, based on at least one cement, the binder comprising
at least one finely divided $SiO_2$ component in the form of precipitated silica having agglomerate particles with particle diameters ($d_{95}$) in the range from 3 to 15 μm and from 94 to 99% $SiO_2$ by weight, pyrogenic silica having primary particles with particle diameters ($d_{95}$) in the range from 0.007 to 0.04 μm and from 96 to 100% $SiO_2$ by weight, or a mixture thereof; and
at least one finely divided CaO component in the form of white fine lime or hydraulic calcined lime with particle diameters ($d_{95}$) in the range from 0.5 to 100 μm, white slake lime or hydraulic slake lime with particle diameters ($d_{95}$) in the range from 0.7 to 100 μm, or a mixture thereof;
wherein the $SiO_2$ and CaO components react with make-up water added to the cement to form calcium silicate hydrate phases that cure as a result of a pozzolanic reaction and produce early strength;
wherein the cement includes clinker phases selected as one from the group of $C_3S$, $C_2S$, $C_3A$, and $C_4AF$; and if appropriate, secondary constituents which on reaction with water form hydrate phases that cure to form hardened cement after the occurrence of a delay phase upon mixing with water, during which time no appreciable curing reaction takes place;
wherein the $SiO_2$ and CaO components react with the make-up water during said delay phase.

2. The binder according to claim 1, wherein the $SiO_2$ component comprises at least two $SiO_2$ components that are different as a result of their method of production and have different $d_{95}$ particle diameter ranges, with one $SiO_2$ component being pyrogenic silica and the second $SiO_2$ component being precipitated silica with the weight ratio of pyrogenic silica:precipitated silica being from 1:1 to 1:50.

3. The binder according to claim 1, wherein the pyrogenic silica component has particle diameters ($d_{95}$) in the range from 0.01 to 0.02 μm.

4. The binder according to claim 1, wherein the $SiO_2$ component is present in amounts of from 0.1 to 5% by weight based on the cement component in the binder.

5. The binder according to claim 1, wherein the CaO component comprises from 90 to 99% by weight of CaO.

6. The binder according to claim 5, wherein the CaO component has particle diameters ($d_{95}$) in the range from 20 to 80 μm.

7. The binder according to claim 1, wherein the CaO component is slaked lime having CaO contents in the range from 60 to 75% by weight.

8. The binder according to claim 1, wherein the cement is a standardized cement in accordance with EN 197 and/or DIN 1164 having a normal fineness with particle diameters ($d_{95}$) in the range from 20 to 70 μm and specific surface areas in the range from 0.3 to 0.8 $m^2/g$, a superfine cement having particle diameters ($d_{95}$) in the range from 2 to 20 μm and a specific surface area of from 1 to 5 $m^2/g$, or a mixture thereof.

9. The binder according to claim 8, wherein the standardized cement is one selected from the group of a portland cement, portland composite cement, and blast furnace slake cement.

10. The binder according to claim 9, wherein the superfine cement is produced on the basis of portland cement clinker and/or superfine ground slag.

11. The binder according to claim 10, wherein the weight ratio of standardized cement to superfine cement is selected as one from the group of 0:100 or from 100:0 to 20:1.

12. The binder according to claim 1, wherein at least one finely divided $SiO_2$ component and at least one CaO component are present in the form of a dry premix.

13. The binder according to claim 2, wherein the weight ratio of pyrogenic silica:precipitated silica is from 1:2 to 1:5.

14. The binder according to claim 5, wherein the CaO component comprises from 95 to 98% by weight of CaO.

15. The binder according to claim 7, wherein the CaO contents is in the range from 70 to 75% by weight.

16. The binder according to claim 11, wherein the weight ratio of normal cement to superfine cement is from 3:1 to 5:1.

17. The binder according to claim 1, wherein the SiO2 and CaO react between about 1 hour and 3 hours after the addition of water.

18. The binder according to claim 1, wherein the delay phase encountered lasts between about 4 hours to about 8 hours.

19. A concrete, mortar, or cement suspension, the concrete, mortar, or cement suspension comprising:
at least one cement, where the cement includes clinker phases and, if appropriate, secondary constituents that react with water to form hydrate phases which cure to form hardened cement; and
a binder that includes at least one finely divided $SiO_2$ component and at least one finely divided CaO component; the $SiO_2$ component being in the form of precipitated silica having agglomerate particles with particle diameters ($d_{95}$) in the range from 3 to 15 μm, pyrogenic silica having primary particles with particle diameters ($d_{95}$) in the range from 0.007 to 0.04 μm, or a mixture thereof; the CaO component being in the form of white lime or hydraulic calcined lime with particle diameters ($d_{95}$) in the range from 0.5 to 100 μm, white slake lime or hydraulic slake lime with particle diameters ($d_{95}$) in the range from 0.7 to 100 μm, or a mixture thereof;
wherein and the cement displays a delay phase after mixing with water of several hours, during which time no appreciable curing reaction takes place;
wherein the SiO2 and CaO components in the binder react with make-up water during the delay phase to form calcium silicate hydrate phases that cure as a result of a pozzolanic reaction and produce early strength.

20. The concrete, mortar, or cement suspension according to claim 19, wherein the cement is one selected from the group of $C_3S$, $C_2S$, $C_3A$, and $C_4AF$.

21. The binder according to claim 1, wherein the white fine lime or hydraulic calcined lime has a specific surface area in the range from 1 to 3 $m^2/g$.

22. The binder according to claim 1, wherein the white slake lime or hydraulic slake lime has a specific surface area in the range from 18 to 25 $m^2/g$.

23. A mineral hydraulic binder for producing concretes, mortars, or cement suspensions, based on at least one cement, the binder comprising at least two $SiO_2$ components that are different as a result of their method of production and have different $d_{95}$ particle diameter ranges, with one $SiO_2$ component being very fine with $d_{95}$ particle diameters in the range from 0.007 to 0.04 μm and the other $SiO_2$ component being coarser with $d_{95}$ particle diameters in the range from 3 to 15 μm and the weight ratio being from 1:1 to 1:50; and at least one finely divided CaO component in the form of white lime or hydraulic calcined lime with particle diameters ($d_{95}$) in the range from 0.5 to 100 μm, white slake lime or hydraulic slake lime with particle diameters ($d_{95}$) in the range from 0.7 to 100 μm, or a mixture thereof;

wherein the $SiO_2$ and CaO components react with make-up water added to the cement to form calcium silicate hydrate phases that cure as a result of a pozzolanic reaction and produce early strength;

wherein the cement includes clinker phases selected as one from the group of $C_3S$, $C_2S$, $C_3A$, and $C_4AF$; and if appropriate, secondary constituents which on reaction with water form hydrate phases that cure to form hardened cement after the occurrence of a delay phase upon mixing with water, during which time no appreciable curing reaction takes place;

wherein the $SiO_2$ and CaO components react with the make-up water during said delay phase.

24. The binder according to claim 23, wherein the weight ratio is from 1:2 to 1:5.

* * * * *